United States Patent
Britton

(10) Patent No.: US 6,776,425 B2
(45) Date of Patent: Aug. 17, 2004

(54) VEHICLE AXLE

(75) Inventor: Phillip John Britton, Northants (GB)

(73) Assignee: The Boler Company, Itasca, IL (US)

( * ) Notice: Subject to any disclaimer, the term of this patent is extended or adjusted under 35 U.S.C. 154(b) by 17 days.

(21) Appl. No.: 10/097,775

(22) Filed: Mar. 14, 2002

(65) Prior Publication Data

US 2002/0130477 A1 Sep. 19, 2002

(30) Foreign Application Priority Data

Mar. 15, 2001 (GB) .............................................. 0106331

(51) Int. Cl.$^7$ ........................................... B62D 17/00
(52) U.S. Cl. .............................. 280/86.75; 280/86.751; 280/103
(58) Field of Search ........................ 280/86.75, 86.751, 280/81.6, 103

(56) References Cited

U.S. PATENT DOCUMENTS

| | | | | |
|---|---|---|---|---|
| 2,099,114 A | * | 11/1937 | Holmes | 280/86.751 |
| 4,029,337 A | * | 6/1977 | Bishop | 280/93.5 |
| 4,278,270 A | * | 7/1981 | Fry | 280/124.106 |
| 4,726,598 A | * | 2/1988 | Walters | 280/81.1 |
| RE33,302 E | * | 8/1990 | Mason | 33/608 |
| 4,953,889 A | * | 9/1990 | Reilly | 280/86.754 |
| 5,087,074 A | * | 2/1992 | Komatsu et al. | 280/788 |
| 5,364,113 A | | 11/1994 | Goertzen | |
| 5,620,194 A | * | 4/1997 | Keeler et al. | 280/81.6 |
| 5,984,330 A | * | 11/1999 | Hasshi et al. | 280/124.146 |
| 6,007,078 A | * | 12/1999 | Gottschalk et al. | 280/86.751 |
| 6,012,724 A | | 1/2000 | Pitkanen | |
| 6,036,217 A | * | 3/2000 | Burkhart et al. | 280/476.1 |
| 6,267,387 B1 | * | 7/2001 | Weiss | 280/5.52 |
| 6,293,724 B1 | * | 9/2001 | Spears et al. | 403/122 |
| 6,473,978 B1 | * | 11/2002 | Maas | 33/203.13 |
| 6,550,797 B2 | * | 4/2003 | Wagner | 280/124.136 |

FOREIGN PATENT DOCUMENTS

| | | |
|---|---|---|
| EP | 0950602 | 10/1999 |
| JP | 2000128011 | 2/1980 |
| JP | 5515345 | 5/2000 |

OTHER PUBLICATIONS

Two (2) database sheets relating to the Japanese references cited above.
A British Patent Office Search Report dated Apr. 25, 2002, which issued in connection with corresponding British patent application GB 0204049.1.

* cited by examiner

*Primary Examiner*—Peter C. English
*Assistant Examiner*—Toan To
(74) *Attorney, Agent, or Firm*—Trexler, Bushnell, Giangiorgi, Blackstone & Marr, Ltd.

(57) ABSTRACT

The invention relates to vehicle axles. Self-steering axle systems are known and are adequate when the vehicle is moving forward but not when the vehicle is reversed. The invention avoids this by having a stub axle assembly located on a support by a first pivot the support being mounted on an axle beam by a second pivot, a drive means to cause the support to pivot between two opertional conditions, and the two pivots being angularly disposed to provide a first castor angle in one position, second opposite castor angle in the second position.

5 Claims, 8 Drawing Sheets

VEHICLE AXLE

RELATED/PRIORITY APPLICATION

This application claims priority with respect to British Application No. 0106331.2, filed Mar. 15, 2001.

BACKGROUND OF THE INVENTION

This invention relates to vehicle axles, and is particularly concerned with fixed lorries and trailer vehicles provided with a supplementary suspension and axle system that is self-steering.

It is already known to provide a vehicle with a self-steering axle system, where the wheels are located on a pivotally mounted axle, such that the wheels can freely turn to follow the steered wheels of the vehicle as the vehicle, for example, progresses round a corner or bend in a road. Such self-steering axle assemblies provide notable advantages over fixed axle systems, by avoiding excessive tyre wear or damage to tyres caused by a transverse shear load applied to a tyre as it slides or bounces whilst progressing round a corner or bend.

Existing constructions of self-steering axles are quite adequate for all occasions (save perhaps for high vehicle speeds) whilst the vehicle is travelling in a forward direction, but suffer serious operational problems when the vehicle is required to be reversed, so much so that self-steering axles are frequently provided with a means of locking the axle against pivoting, when a reverse movement is needed, but with attendant wear on the tyres of the wheels on the self-steering axle.

The cause of this stems from the setting of pivot for the axle at an appreciable castor angle, to provide a line of action that projects from the axis of pivot through the road wheel centre and to a point on the tyre surface in advance of the tyre road contact. By providing the axle with an appreciable amount of castor angle, there is the substantial guarantee that the road wheels of the self-steering axle will hold in a straight line when the vehicle is travelling in a forward direction and the self-steering axle will follow the steered axle when the vehicle is travelling in a forward direction around a corner or bend.

OBJECTS AND SUMMARY OF THE INVENTION

The object of the present invention is to provide a means of eliminating those operational problems attendant to known supplementary suspension and axle systems when the vehicle is being reversed.

According to the present invention, a vehicle axle comprises a stub axle assembly mounted by a first pivot on a support, and the support being mounted on a second pivot on an axle beam, said support being provided with a means of causing it to pivot between two operational positions, and to hold the support in a required operational position, and said first and second pivots being disposed at a convergent angle whereby to set the first pivot at a first castor angle in one operational position, and at an equal and opposite second castor angle in the other operational position.

The particular means of causing the support to pivot and to hold it in its required operational position is not critical, but can conveniently be chosen to suit the power supply on the vehicle. Thus with vehicles with a compressed air system for such as the brakes, two air springs may be provided, one to either side of the support. With one air spring disconnected, the other can be activated to cause the support to pivot, and lock it in its required position. With vehicles having hydraulic systems, hydraulic piston and cylinders can be provided, single or double acting, to cause the support to pivot and lock it in its required position.

BRIEF DESCRIPTION OF THE DRAWINGS

The invention will now be described briefly with reference to the accompanying drawings in which:

FIGS. 5 and 6 are plan views respectively of. FIGS. 3 and 4;

DETAILED DESCRIPTION OF THE INVENTION

Figure 1:
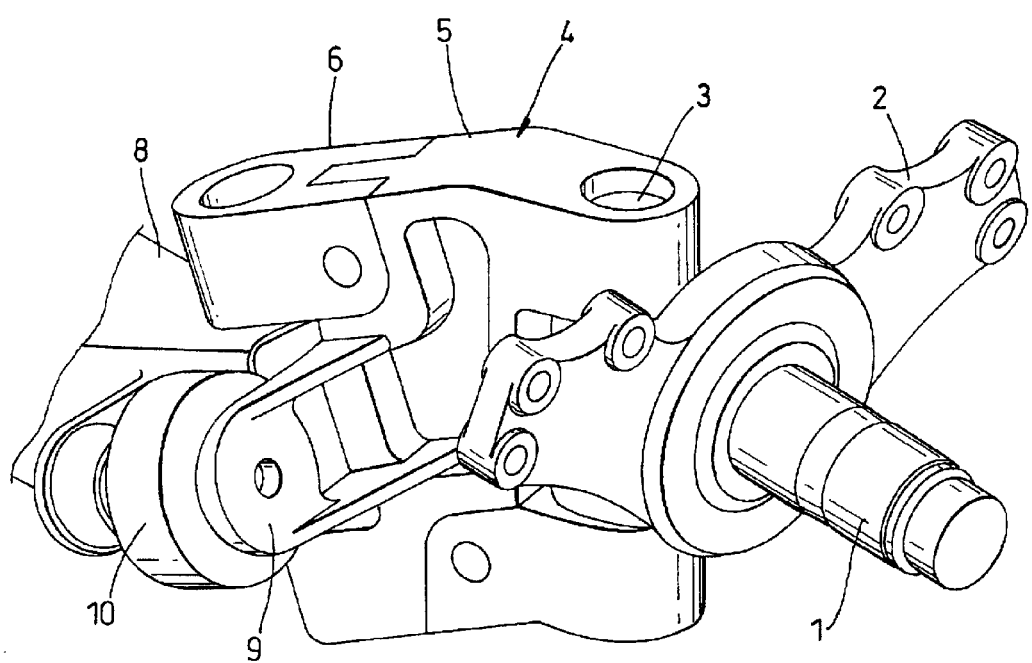
FIG. 1 is a perspective view of a vehicle axle according to the invention; set for forward travel.

In the drawings, a stub axle 1 for a supplementary suspension and axle system has an attachment plate 2 to which a vehicle wheel (not shown) may be directly or indirectly attached, the axle 1 being secured to a first pivot 3 in bearings on a support 4 such that the axle can pivot freely about the support. The support may be of unitary construction, but conveniently it is formed by two cast, forged or machined components 5, 6 suitably secured together, the component 6 being formed with bearings for a second pivot 7 attaching the support to the vehicle frame or to an axle beam 8.

Figure 7:
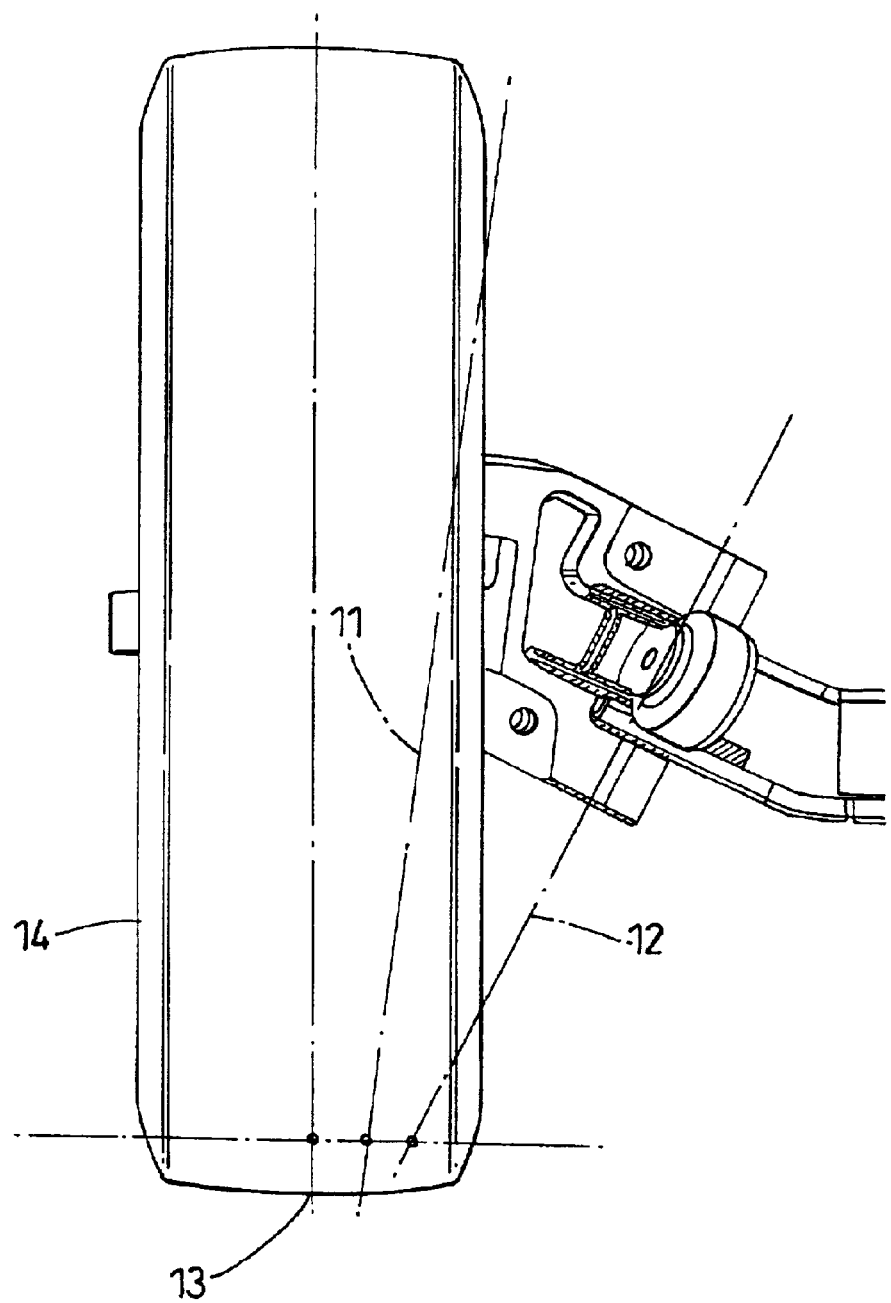
FIG. 7 is rear elevation of FIG. 1 with a wheel and tyre fitted in place.

The first and second pivots 3, 7 whilst lying in the same plane are angularly disposed with respect to each other at an angle that is downwardly convergent. It is also desirable as is indicated in FIG. 7 that the angles of inclination 11 and 12 of the pivots 3 and 7 respectively are such that they are as closely coincident with each other and with the point of ground contact 13 of a tire 14 on a wheel on the stub axle 1, as is practicable. This minimises actuating and locking forces transmitted through the tire.

Figure 2:
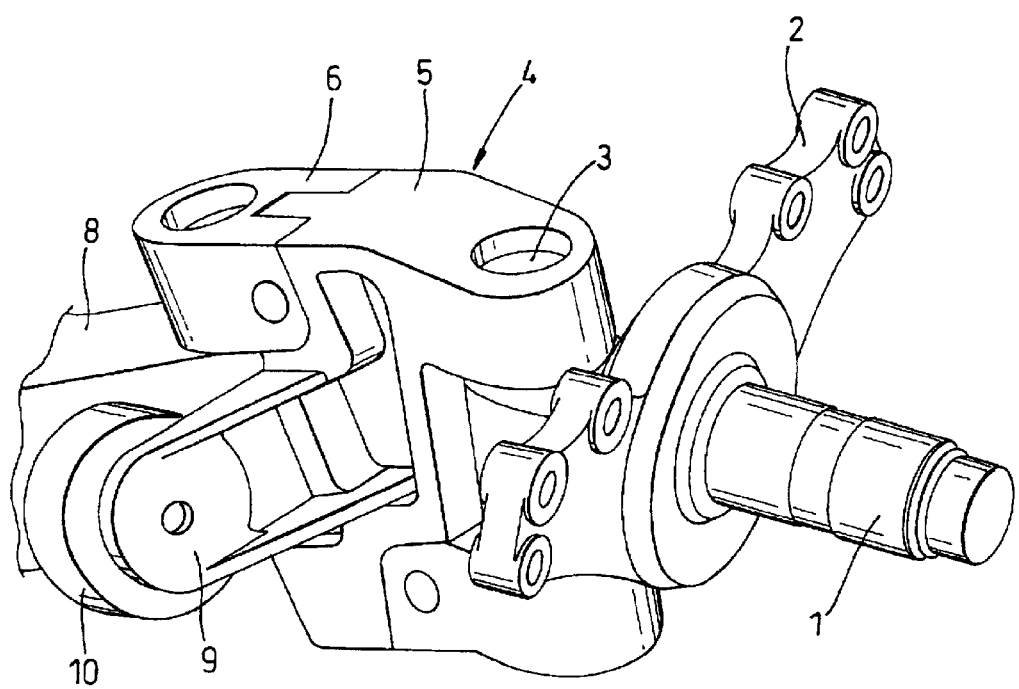
FIG. 2 corresponds to FIG. 1 but shows the axle set for reverse travel.
Figure 3:
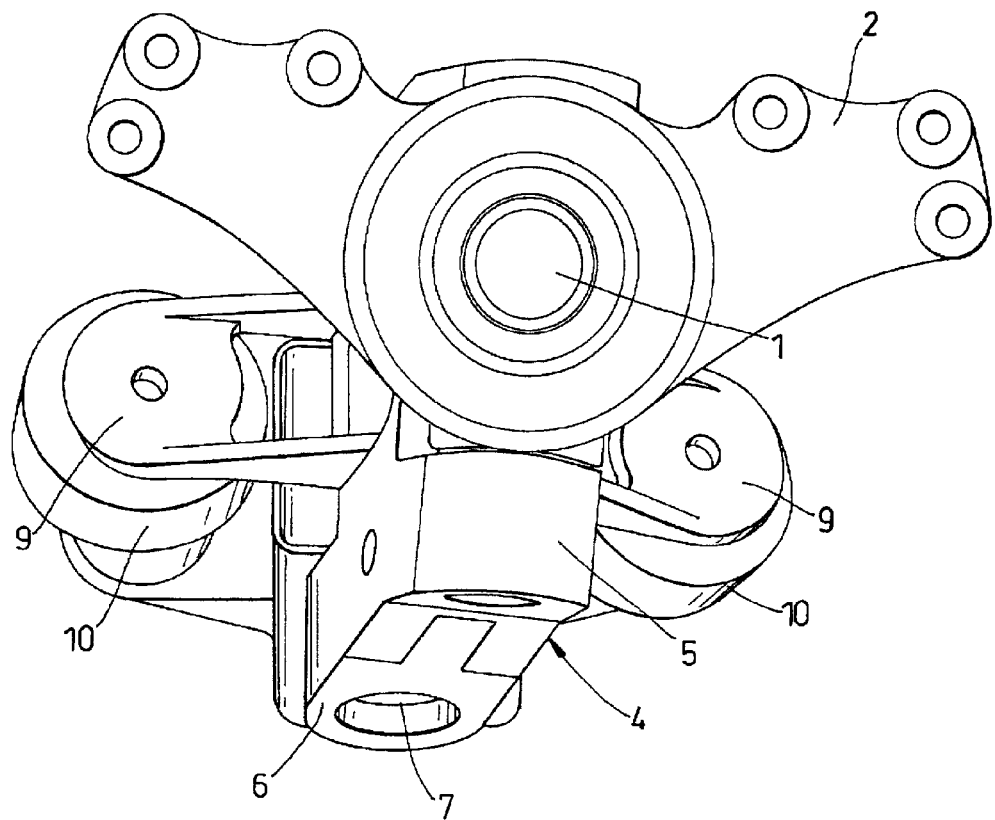
FIGS. 3 and 4 are front elevations respectively of FIGS. 1 and 2.
Figure 4:
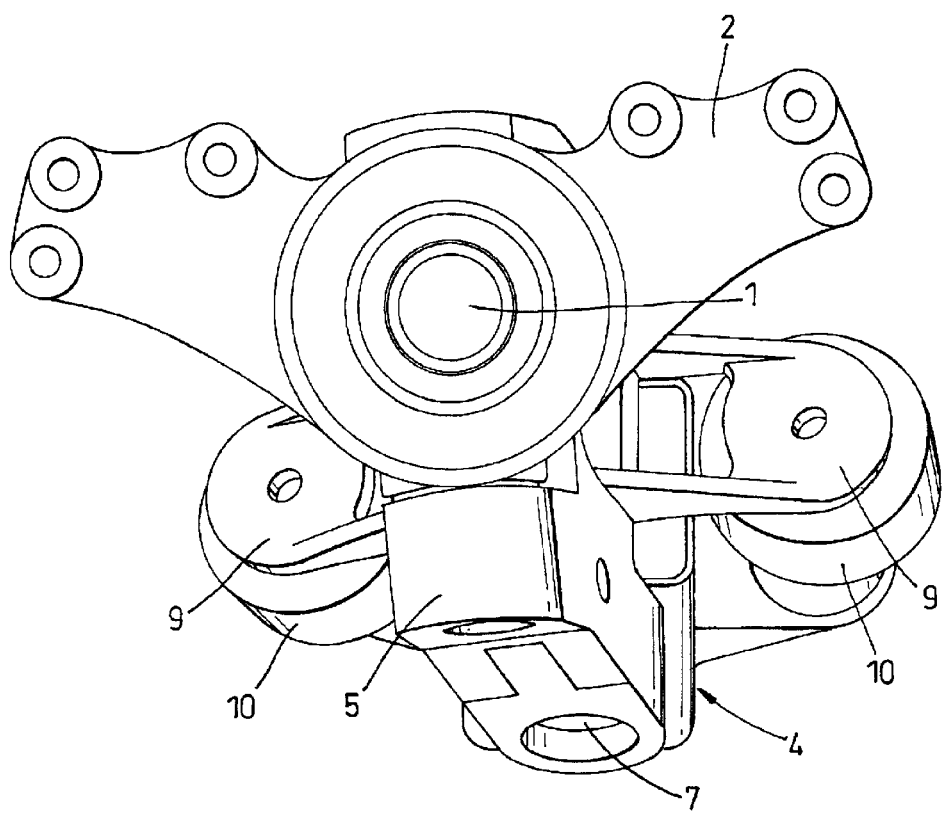
Figure 5:
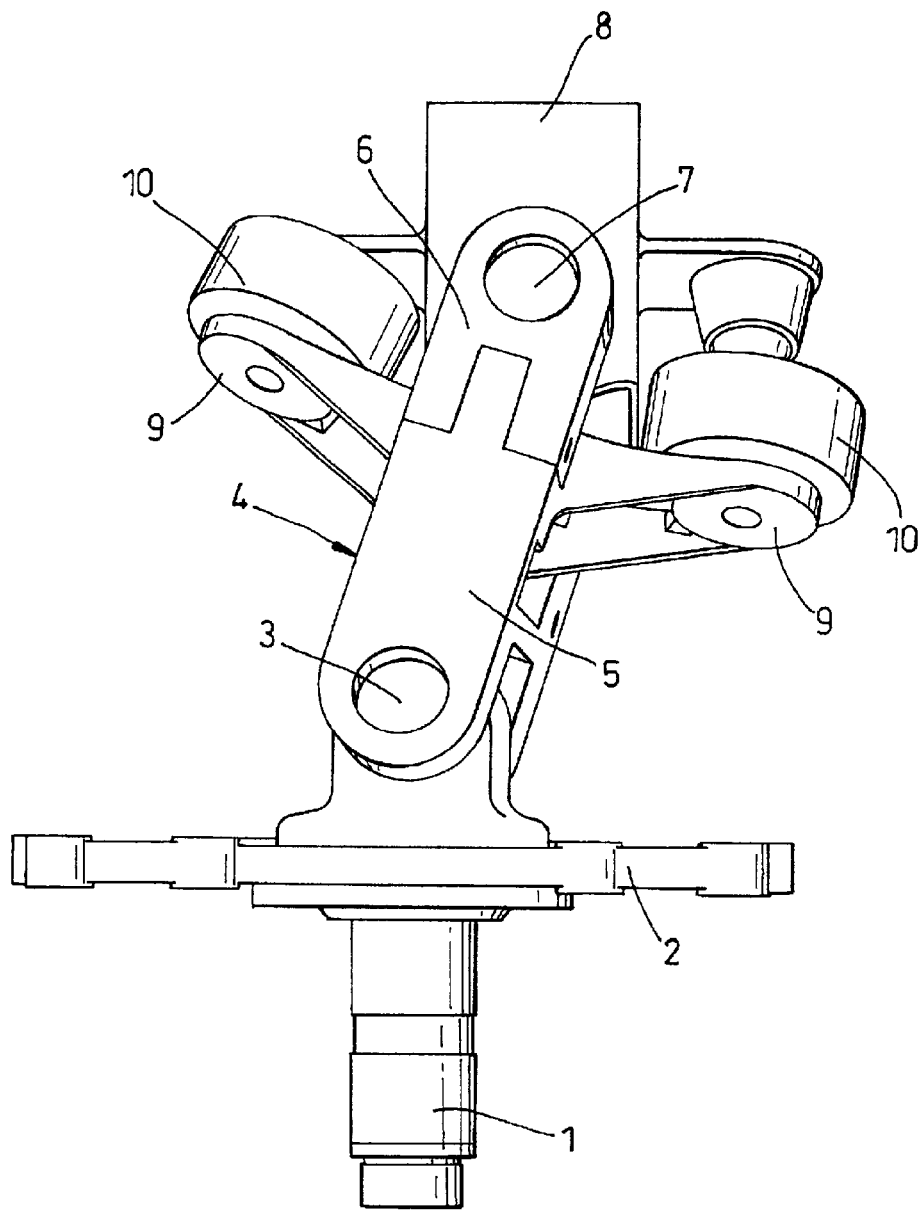
Figure 6:
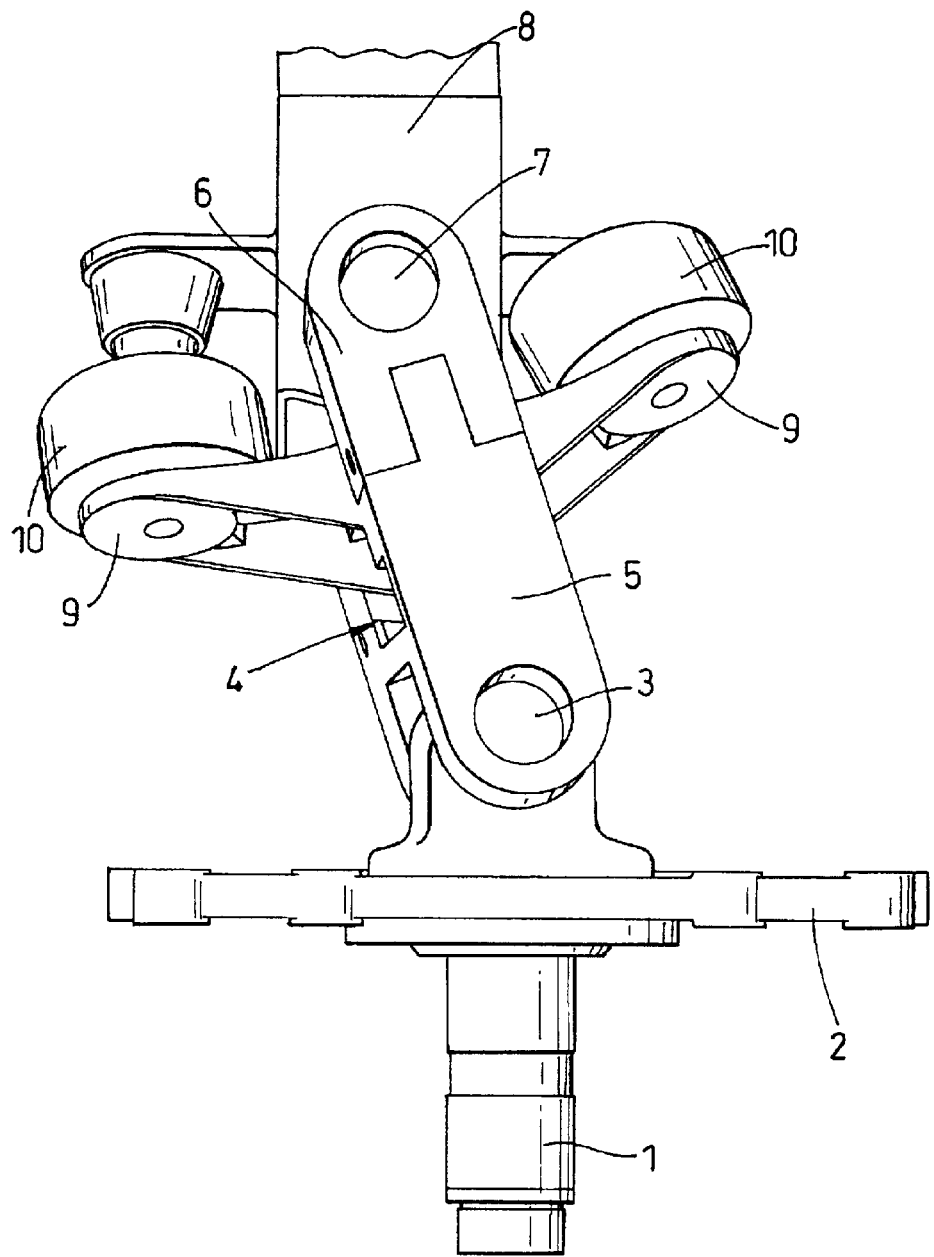

To each side of the support 4 is an attachment 9 for an air spring 10 whereby to cause the support arm to pivot from its position as shown in FIGS. 1, 3, 5 and 8 to its position as shown in FIGS. 2, 4. 6 and 9, and to lock the support in the one or the other of its operational positions.

Figure 8:
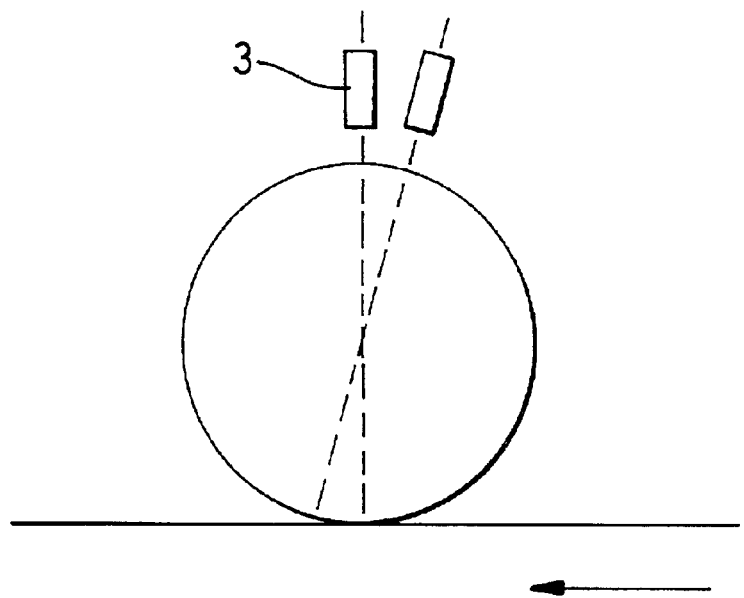
FIGS. 8 and 9 are schematic representations of the axle systems set respectively for forward and reverse travel.

As is indicated in FIG. 8, and when the support is in its position for a forward movement of the vehicle, the pivot 3 for the axle is provided with a positive castor angle to provide a line of action through the vehicle wheel centre to a point on the wheel periphery in advance of the point of road contact in the forward direction of travel, and consequently there is the substantial guarantee that the self-steering axle wheels will follow the steered axle wheels during normal forward travel in both a straight line, and when progressing around a corner or bend.

Figure 9:
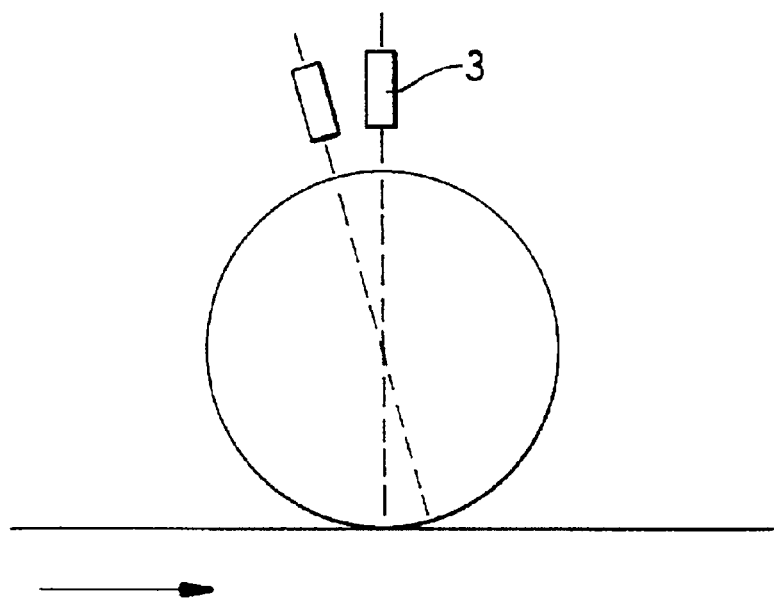

When the vehicle needs to be reversed, the air springs 10 can be operated to pivot the support 4 about the pivot 7 to its position shown in FIGS. 2, 4, 6 and 9, where again the support is locked in position. As is indicated by FIG. 9, the pivot 3 for the axle is provided with a negative castor angle, again to provide a line of action through the vehicle wheel centre to a point on the wheel periphery in advance of the point of road contact in the reverse direction of travel, and consequently there is the substantial guarantee that the self-steering axle wheels will follow the steered axle wheels during normal reverse travel of the vehicle.

The positive and negative castor angles should be greater than 3°, and preferably at or about 6° relative to the vertical plane containing the axle centre and the point of ground contact by the wheel.

Although not illustrated, it may be advisable to provide a means of locking the axle 1 against pivoting with respect to the support 4, when high speed forward travel is intended.

What is claimed is:

1. A vehicle axle comprising a stub axle assembly mounted by a first pivot on a support, and the support being mounted on a second pivot on an axle beam, said support being provided with a means of causing it to pivot between two operational positions, and to hold the support in a required operational position, and said first and second pivots being disposed at a convergent angle such that the first pivot is positioned at a first castor angle in one operational position when the vehicle to which the vehicle axle is fitted is moving in one direction, and in an equal and opposite castor angle after pivoting of the support to the second operational condition when the vehicle to which the vehicle axle is fitted is moving in the opposite direction.

2. A vehicle axle as in claim 1, wherein the particular means of causing the support to pivot and to hold it in its required operational position is activated by an available power supply on the vehicle.

3. A vehicle axle as in claim 2, wherein two air springs are provided, one to either side of the support.

4. A vehicle axle as in claim 2, wherein one air spring is deactivatable and the other air spring activatable to cause the support to pivot and lock it in its required position.

5. A vehicle axle as in any one of claims 1, 2, 3 and 4, wherein the convergent angle between the first and second pivots are such that they are substantially coincident with each other at the point between a wheel on the stub axle assembly and the ground.

* * * * *